March 11, 1947.  O. J. ALVAREZ  2,417,340
LANDING GEAR
Filed March 23, 1944  3 Sheets-Sheet 1
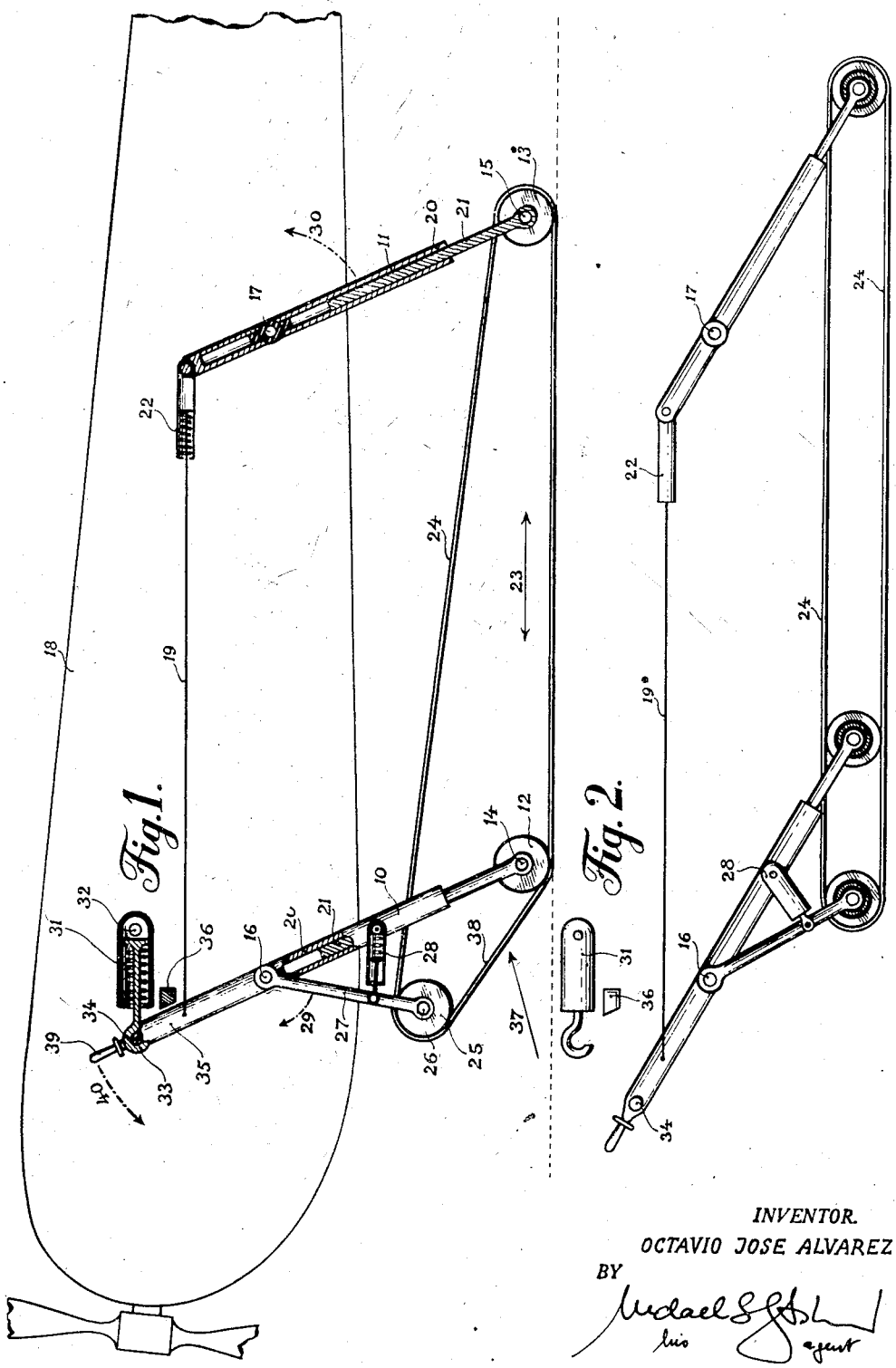
INVENTOR.
OCTAVIO JOSE ALVAREZ
BY March 11, 1947. O. J. ALVAREZ 2,417,340
LANDING GEAR
Filed March 23, 1944 3 Sheets-Sheet 2
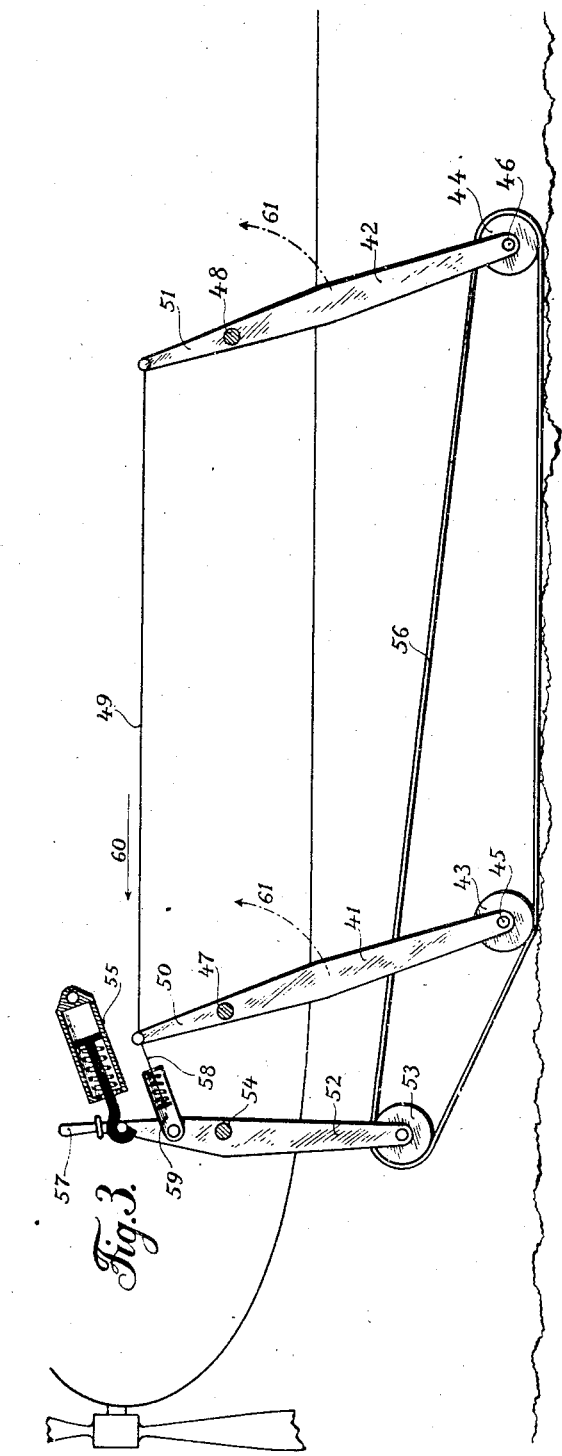
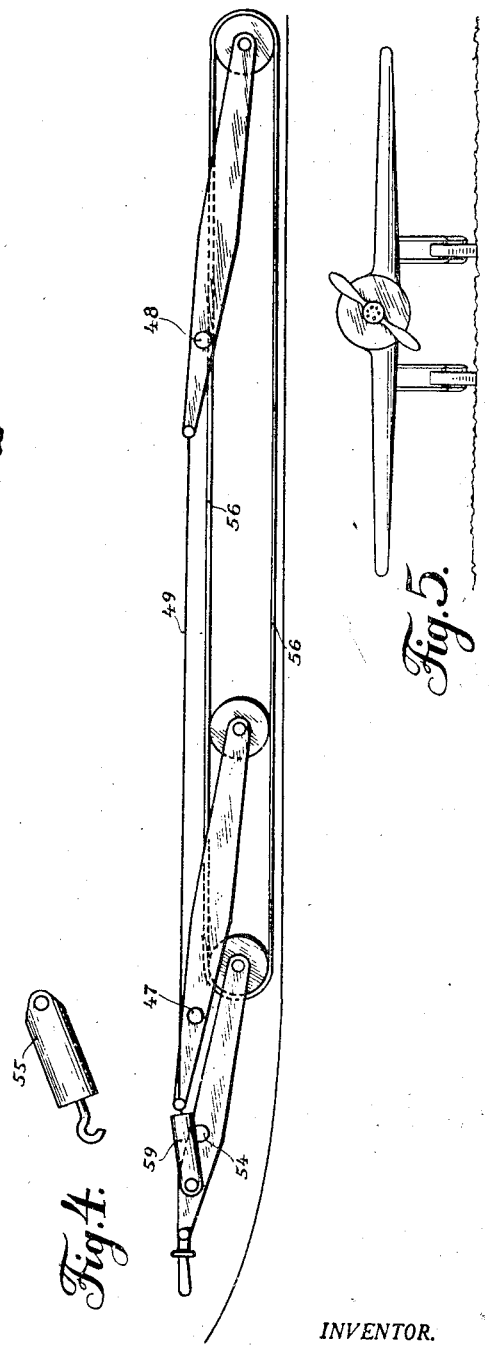
INVENTOR.
OCTAVIO JOSE ALVAREZ

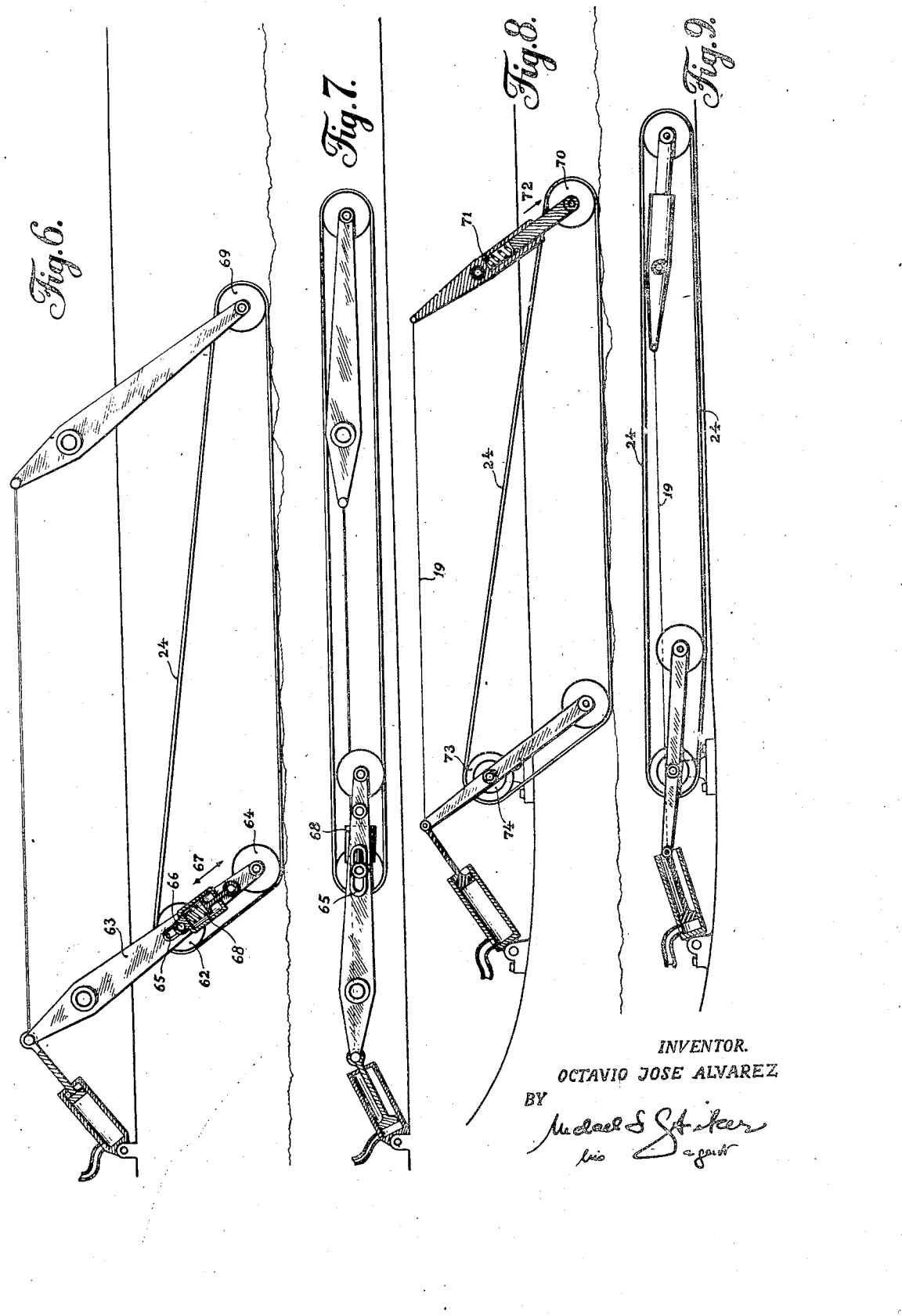

Patented Mar. 11, 1947

2,417,340

UNITED STATES PATENT OFFICE 2,417,340

LANDING GEAR

Octavio Jose Alvarez, New York, N. Y., assignor to Alvarez Patent Corporation, New York, N. Y.

Application March 23, 1944, Serial No. 527,848

22 Claims. (Cl. 224—102)

My present invention relates to caterpillar type landing gears for aircraft.

It is an object of my present invention to make such landing gears retractable from operative landing position below the aircraft into inoperative flying position inside the body of the craft so as to reduce the resistance offered by such gears during flight.

It is another object of my present invention to provide means keeping the caterpillar belt tight during movement of the landing gear from operative landing into inoperative retracted flying position and back.

Still another object of my present invention is to make landing gears of this type in such a manner that practically no delicate and injurable portions of the gear are located outside of the body of the plane.

Still another object of my present invention is to construct a retractable landing gear in such a manner that only two narrow slots are required for moving the gear into the body of the aircraft and out of the same.

Still another object of my present invention consists in the combination of a caterpillar type landing gear with means for rotating the caterpillar belt before and during landing.

A further object of my present invention consists of a landing gear built in such a manner as to enable landing of the aircraft on rough ground and snow.

Still a further object of my present invention consists of a caterpillar type landing gear in which the single portions of the caterpillar belt are resiliently supported by independent supports enabling adjustment of the running surface of the landing gear to irregularities of the landing ground.

Still a further object of my present invention consists of a new landing gear which is resilient in direction of landing of the aircraft, thereby making the landing softer and reducing the stresses in the gear and craft during landing.

With the above objects in view, my present invention mainly consists of a caterpillar type landing gear comprising at least two supporting arms turnably pivoted at their upper ends to the body of the aircraft, supporting rollers freely rotatably pivoted to the lower ends of these supporting arms, a caterpillar belt running on said rollers, and spring means for tightening this caterpillar belt. Since these belt tightening means are resilient, landing gears of the above type fulfill the most important objects of my present invention, namely to make the landing softer and reduce the stresses in the gear and craft during landing.

The belt tightening spring means mentioned above may be secured to one of the supporting arms; they may, however, also consist of a separate belt tightening roller turnably secured to the body of the aircraft by a pivoting arm and cooperating with spring means in such a manner as to permanently tighten the caterpillar belt.

This spring operated belt tightening roller is preferably arranged in front of the foremost supporting arm slightly above the plane defined by the supporting rollers, so as to form an inclined belt portion further facilitating landing of the aircraft on rough ground.

In order to make the landing gear retractable, it is advisable to arrange the supporting arms parallelly spaced from each other in longitudinal direction of the aircraft and to attach them at their upper ends to the body of the craft in a horizontal plane. It is furthermore advisable to make these supporting arms of equal length so that each of the supporting rollers is at equal distance from that point at which the corresponding supporting arm is turnably pivoted to the body of the craft. Finally, means must be provided for guiding the supporting arms parallelly to each other during turning of the same about their pivoting axes. It is evident that in such an arrangement the distance between the supporting rollers will be constant during turning of the supporting arms and thus the caterpillar belt will remain tight during turning movement of the landing gear from operative position below the aircraft into inoperative retracted position inside the body of the aircraft and back.

In order to make the entire landing gear more resilient when in operative landing position, I provide spring means tending to hold the landing gear in such operative position below the body of the craft. Such spring means might be arranged, for instance, in such a manner as to force the supporting arms to turn about their pivoting axes together with the supporting rollers and the caterpillar belt in direction of movement of the aircraft; these spring means are then combined with stop means limiting such turning movement of the supporting arms in forward direction. It is evident that when the aircraft is landing, the gear will be forced back against action of the spring means, and thus these spring means will soften the impact of the landing.

The above mentioned means for parallelly guiding the supporting arms during turning of the same consist preferably of connecting members secured to and connecting the supporting arms, thus forcing all arms to follow if one of them is turned. These connecting means are preferably resilient so as to enable each of the arms to turn within slight limits independently from the others if the supporting rollers are moving over irregularities of the landing ground.

It is also advisable to connect the pivoting arm carrying the belt tightening roller with the supporting arms by preferably resilient connecting means; this enables moving of the entire landing gear from landing into retracted position and back by simply turning the pivoting arm at its upper end inside the body of the aircraft. In operative position, this pivoting arm is then connected with the spring means mentioned above, which then serve simultaneously for tightening the caterpillar belt and for resiliently holding the entire landing gear, i. e. the supporting arms, supporting rollers and caterpillar belt, in operative landing position.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1 is a schematic side view of an embodiment of my new landing gear, showing the same in operative landing position;

Figure 2 is a schematic side view of the same landing gear, in inoperative retracted position;

Figure 3 is a schematic side view of another embodiment of my new landing gear, shown in operative landing position;

Figure 4 is a schematic side view of the landing gear shown in Figure 3 in inoperative retracted position;

Figure 5 is a schematic front view of the landing gear shown in Figures 3 and 4 in operative landing position;

Figure 6 is a schematic side view of another embodiment of a landing gear according to my present invention, in operative landing position;

Figure 7 is a schematic side view of the landing gear shown in Figure 6, in retracted inoperative position;

Figure 8 is a side view of still another embodiment of a landing gear according to my present invention provided with so-called pre-rotation means, in operative landing position; and Figure 9 is a side view of the embodiment shown in Figure 8, in inoperative retracted position.

Before proceding with the detailed description of my invention, I wish to state that I have shown in the attached drawings some embodiments of my present invention only and that the same are shown only in a purely schematic way. It should be stressed that I do not intend to be limited to the embodiments and the fact that I have shown these embodiments only schematically does not mean that my new landing gear does not also include all details and construction elements which are part of usual landing gears of this type. However, since schematic showing greatly facilitates understanding of the basic principles of my present invention, the same will be explained in connection with the attached schematic drawings only.

The new landing gear shown in Figures 1 and 2 comprises two supporting arms 10 and 11 to which the supporting rollers 12 and 13 are freely rotatably attached by means of shafts 14 and 15 respectively. These supporting arms 10 and 11 are turnably secured to the body 18 of the aircraft by means of shafts 16 and 17 respectively.

Since the arrangement of these shafts and their interrelation is important, I wish to characterize the same in detail before further proceeding with my description: first of all, all these shafts are arranged parallel to the transversal axis of the aircraft. Furthermore, the shafts 16 and 17 turnably attaching the supporting arms 10 and 11 to the aircraft are arranged in a horizontal plane. This holds also true for shafts 14 and 15 freely rotatably supporting the rollers 12 and 13, which shafts are also arranged in a horizontal plane. Finally, it should be mentioned that the two supporting arms 10 and 11 are arranged parallelly.

Thus, it is clear that the distance between the shafts 14 and 16 is equal to the distance between the shafts 15 and 17. Furthermore, the distance between shafts 14 and 15 is equal to the distance between the shafts 16 and 17. Therefore these four shafts define a parallelogram and it is self-evident that the length of the sides of this parallelogram, i. e. the distances mentioned above, will not change if and when the two arms 10 and 11 are turned about shafts 16 and 17 in such a manner as to remain parallel during such turning.

In order to retain shafts 10 and 11 in such parallel position, I provide a connecting member, e. g. a connecting bar, truss or wire 19 between the shafts 14 and 15 or two other points on the arms 10 and 11 which are at equal distance from the shafts 16 and 17. Such connecting means will cause parallel motion of the supporting arms 10 and 11 during turning of the same about the shafts 16 and 17.

I wish to mention that in order to enable the supporting rollers 14 and 15 to follow irregularities of the ground, the supporting arms 10 and 11 are constructed in such a manner as to be resilient in longitudinal direction. Such resiliency may be obtained either by mechanical spring means of well-known type or by pneumatical means. Such pneumatical means—also well known in the art—are schematically indicated in Figure 1 by showing each of the supporting arms as consisting of two tubular parts 20 and 21 telescopically fitting into each other; these tubular parts are connected by a conduit, not shown in the drawing, with a source of compressed air or the like. It is evident that by regulating the pressure it is possible to regulate the resiliency of the supporting arms 10 and 11.

I have found it also advisable to provide in the connecting wire 19 spring means 22 so as to enable slight relative movements of the supporting rollers 12 and 13 in direction of arrow 23.

A further important part of my new landing gear is of course the caterpillar belt 24 running on the supporting rollers 12 and 13. In order to keep this belt tight, I provide as shown in Figure 1 a belt tightening roller 25. This roller is freely rotatably attached by means of shaft 26 to pivoting arm 27 which latter is freely turnably secured to the supporting arm 10. In order to keep belt 24 tight, a compression spring 28 is provided between the pivoting arm 27 and the supporting arm 10 in the way shown in the drawing. This compression spring will tend to turn the pivoting arm 27 in direction of arrow 29, thereby forcing the tightening roller 25 away from the supporting rollers 12 and keeping the caterpillar belt 24 permanently tight.

It is evident that this landing gear as described above is freely turnable about the pivoting shafts 16 and 17 and would, if not otherwise secured, move in direction of arrow 30 during landing and thus actually turn inside the body of the aircraft, as shown in Figure 2, and be useless for landing purposes.

In order to keep the landing gear in operative landing position shown in Figure 1, I provide a spring member 31 firmly secured at one end to body 18 of the aircraft by means of pivot 32 and provided at its other end with a hook 33 or similar attaching member cooperating with pin 34 secured to the upper end portion 35 of the supporting arm 10. In order to avoid turning of the landing gear beyond operative landing position by spring member 31, I provide stop means 36 limiting turning of the landing gear against direction of arrow 30 and holding the gear in operative position.

This landing gear operates as follows: in operative landing position shown in Figure 1, the spring member 31 is hooked into pin 34 holding the landing gear in operative position. When the plane lands, the landing impact will push the entire landing gear in direction of arrow 37 against action of spring 31. This spring will slightly yield to this impact, softening its effect on the landing craft. It should not be overlooked that during landing the inclined portion 38 of the caterpillar belt will also facilitate overcoming of irregularities of the ground by making it possible for the landing gear to actually climb over the same.

During flight, the landing gear can be retracted by detaching hook 33 from pin 34 and pulling handle 39 in direction of arrow 40, thereby turning the entire landing gear around shafts 16 and 17 into retracted inoperative flying position shown in Figure 2. It should be noted that it is advisable to arrange the tightening roller 25 and the pivoting arm 27 in such a manner that in retracted flying position the distance between this tightening roller 25 and the supporting rollers is the same as in operative landing position, so as to keep the belt permanently tight and to prevent it from becoming loose or detaching itself.

The preferred embodiment of my invention shown in Figures 3 to 5 is similar to the one described above and it is therefore unnecessary to describe all parts of the same in detail. Thus, it is evident that the supporting arms 41 and 42 are arranged in the same way as arms 10 and 11 respectively. The rollers 43 and 44 correspond to rollers 12 and 13 respectively of the embodiment shown in Figures 1 and 2. Furthermore, the relative arrangement of the shafts 45, 46, 47 and 48 is the same as that of shafts 14, 15, 16 and 17; of course, the relations of the distances between these shafts are also identical to those of shafts 14, 15, 16 and 17.

A further constructive similarity between this embodiment and the one described above is that also in this case the distance holding connecting cable 49 corresponding to cable 19 of the embodiment shown in Figure 1 is arranged inside the aircraft body over the shafts 47 and 48 secured to extensions 50 and 51 of the supporting arms 41 and 42 respectively. Of course, the length of this connecting wire 49 has to be equal to the distance between the shafts 47 and 48 so as to enforce parallel motion of the supporting arms 41 and 42 during turning.

In this preferred embodiment, the pivoting arm 52 is freely rotatably carrying the belt tightening roller 53 and pivoted by means of shaft 54 to the aircraft body in the same horizontal plane in which shaft 47 and 48 are arranged. Spring member 55 acts in the same way as the spring member 31 described above: it tightens the caterpillar belt 56 and simultaneously holds the entire landing gear in operative landing position, shown in Figure 3.

In order to enable turning of the landing gear from operative landing into inoperative flying position shown in Figure 4, by means of the handle 57 secured to the upper end of the pivoting arm 52 I provide between the upper part of this pivoting arm and the upper end of extension 50 of supporting arm 41 a connecting wire 58; this wire is preferably combined with a tension spring 59 so as to make this connection resilient. It is evident that if and when spring member 55 is detached from pivoting arm 52, it is possible to turn the landing gear from operative into inoperative position by means of the handle 57; for this purpose, it is only necessary to push handle 57 forward which will cause the wire 58 to pull the upper ends of the extensions 50 and 51 of the supporting arms 41 and 42 respectively in direction of arrow 60 and thus result in turning of the supporting arms 41 and 42 in direction of arrows 61. Such movement of the supporting arms will then turn the entire landing gear into the retracted inoperative flying position shown in Figure 4.

The embodiment shown in Figures 6 and 7 is similar to those shown in Figures 1 and 2. The difference is that the tightening roller 62 is secured to the supporting shaft 63 of the supporting roller 64 by means of slot 65 and pin 66 slidably in longitudinal direction of this shaft 63, as indicated by arrow 67. A spring member 68 of well-known type tends to move roller 62 away from roller 64, thereby permanently tightening the caterpillar belt 24 running on the supporting rollers 64, 69 and the tightening roller 62.

In the embodiment shown in Figures 8 and 9, the rear supporting roller 70 serves for purposes of tightening the caterpillar belt 24. This tightening effect is obtained by spring member 71 forcing the roller 70 in direction of arrow 72. The roller 73 combined with and driven by motor 74 serves for rotating the caterpillar belt 24 before and during landing.

I wish to note in this connection that it is also possible to provide in the embodiments described above and shown in Figures 1 to 7 means for pre-rotating the caterpillar belt 24, i. e. for rotating this belt before and during landing. For such purposes, I might use an electric motor driving any one of the supporting rollers or even the belt tightening roller. Of course, it is also possible to provide in the embodiments described above a separate roller driven by a motor serving exclusively for rotating the belt before and during landing.

I wish to note that it is also possible to connect the supporting shafts and the pivoting arm shown in Figures 3 and 4 by a second cable which is parallel to cable 49 but extends below those points at which the shafts are pivoted to the body of the aircraft. Such additional cable would relieve the caterpillar belt during landing and thus reduce the stress to which this belt is exposed.

I wish to stress again that I have described above only preferred embodiments of my present invention and that various changes and adaptations of the same are possible. Thus, for instance it is sometimes advisable to increase the number of parallel supporting arms and supporting rollers, thereby enlarging the running surface of the caterpillar belt. It is of course also possible to provide resilient connections instead of rigid ones at almost all points where such rigid connections are shown in the drawings, so as to make the entire landing gear more resilient.

It will be understood that each of the elements described above, or two or more together, may also find a useful application in other types of aircraft differing from the types described above; it is also possible to use collapsible caterpillar arrangements of the type described for other kinds of transporting means, as for instance vehicles and transporting belts.

While I have illustrated and described the invention as embodied in airplanes, I do not intend to be limited to the details shown, since various modification and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A caterpillar type landing gear for aircraft comprising at least two supporting arms freely turnably pivoted at their upper ends to the body of said aircraft, one supporting roller freely rotatably pivoted to the lower end of each of said supporting arms, means for maintaining said freely movable supporting arms in operative position whenever desired, a caterpillar belt running on said rollers, independent means for tightening said caterpillar belt secured to one of said supporting arms and means for turning said supporting arms about their pivoting axes so as to turn said supporting arms together with said supporting rollers and said caterpillar belt at least substantially inside the body of said aircraft whenever required.

2. A caterpillar type landing gear for aircraft comprising at least two supporting arms arranged spaced from each other in longitudinal direction of said aircraft freely turnably pivoted to the body of said aircraft, supporting rollers freely rotatably pivoted to the lower ends of said supporting arms, means for maintaining said freely movable supporting arms in operative position whenever desired, a caterpillar belt running on said rollers, and an independent spring-operated belt tightening roller arranged spaced from the foremost of said supporting arms in front of the same slightly above the plane defined by said supporting rollers so as to form an inclined belt portion facilitating landing of the aircraft on rough ground and maintaining said caterpillar belt in stressed position independently from the position of the supporting arms relative to said aircraft.

3. A caterpillar type landing gear for aircraft comprising at least two supporting arms arranged spaced from each other in longitudinal direction of said aircraft freely turnably pivoted to the body of said aircraft, supporting rollers freely rotatably pivoted to the lower ends of said supporting arms, means for maintaining said freely movable supporting arms in operative position whenever desired, a caterpillar belt running on said rollers, and an independent spring-operated belt-tightening roller freely rotatably pivoted to the foremost of said supporting arms spaced in front of the same slightly above the plane defined by said supporting rollers so as to form an inclined belt portion facilitating landing of the aircraft on rough ground and maintaining said caterpillar belt in stressed position independently from the position of the supporting arms relative to said aircraft.

4. A caterpillar type landing gear for aircraft comprising at least two supporting arms arranged spaced from each other in longitudinal direction of said aircraft freely turnably pivoted to the body of said aircraft, supporting rollers freely rotatably pivoted to the lower ends of said supporting arms, means for maintaining said freely movable supporting arms in operative position whenever desired, a caterpillar belt running on said rollers, an independent belt tightening roller, a pivoting arm rotatably holding said roller and being turnably pivoted to the body of said aircraft so as to be positioned in front of the foremost of said supporting arms, and means forcing said pivoting arm holding said belt tightening roller away from said foremost supporting arm and maintaining said caterpillar belt stressed independently from the position of said supporting arms and said rollers secured thereto relative to said aircraft.

5. A caterpillar type landing gear for aircraft comprising at least two parallel supporting arms arranged spaced from each other in longitudinal direction of said aircraft freely turnably pivoted to the body of the same, supporting rollers freely rotatably pivoted to the lower ends of said supporting arms in a horizontal plane, means for maintaining said freely movable supporting arms in operative position whenever desired, a caterpillar belt running on said rollers, means attaching said supporting arms at their upper ends to the body of said aircraft in a horizontal plane, and an independent spring-operated belt-tightening roller arranged spaced from the foremost of said supporting arms in front of the same slightly above the plane defined by said supporting rollers so as to form an inclined belt portion facilitating landing of the aircraft on rough ground and maintaining said caterpillar belt in stressed position independently from the position of the supporting arms relative to said aircraft.

6. A caterpillar type landing gear for aircraft comprising at least two parallel supporting arms of equal length turnably pivoted to the body of said aircraft in a horizontal plane spaced from each other in longitudinal direction of said aircraft, means guiding said supporting arms parallelly to each other during turning of the same about their pivoting axes, supporting rollers freely rotatably pivoted to the lower ends of said supporting arms, a caterpillar belt running on said rollers means forcing said supporting arms to turn about their pivoting axes so as to move said supporting rollers together with the caterpillar belt in direction of movement of said aircraft, stop means limiting said turning movement of said supporting arms in direction of movement of said aircraft, and hand operated means for turning said supporting arms about their pivoting axes so as to turn said supporting arms together with said supporting rollers and said caterpillar belt at least substantially inside the body of said aircraft whenever required.

7. A caterpillar type landing gear for aircraft comprising at least two parallel supporting arms turnably pivoted to the body of said aircraft spaced from each other in longitudinal direction of said aircraft, means guiding said supporting arms parallelly to each other during turning of the same about their pivoting axes, supporting rollers freely rotatably pivoted to the lower ends of said supporting arms, a caterpillar belt running on said rollers, means tending to turn said supporting arms about their pivoting axes in direction of movement of said aircraft, stop means limiting such turning movement of said supporting arms when said supporting rollers and said caterpillar belt supported by the same are in operative landing position, and hand operated means for turning said supporting arms about their pivoting axes against direction of movement of said aircraft so as to turn said supporting arms together with said supporting rollers and said caterpillar belt at least substantially inside the body of said aircraft, whenever required.

8. A caterpillar type landing gear for aircraft comprising a series of parallel supporting arms turnably pivoted to the body of said aircraft in a horizontal plane spaced from each other in longitudinal direction of said craft, means guiding said supporting arms parallel to each other during turning of the same about their pivoting axes of attachment, supporting rollers freely rotatably pivoted to the lower ends of said supporting arms, a caterpillar belt running on said rollers, spring means for tightening said caterpillar belt, means holding said supporting arms resiliently in operative position, and means for turning said supporting arms about their pivoting axes of attachment against the direction of movement of said aircraft so as to turn said supporting arms together with said supporting rollers and said caterpillar belt at least substantially inside the body of said aircraft, whenever required.

9. A caterpillar type landing gear for aircraft comprising a series of parallel supporting arms turnably pivoted to the body of said aircraft in a horizontal plane spaced from each other in longitudinal direction of said aircraft, connecting means turnably secured to points of said supporting arms which are spaced from said points of pivotal attachment to said aircraft body and lying also in a horizontal plane, said connecting means guiding said supporting arms parallel to each other during turning of the same about their pivoting axes of attachment, supporting rollers freely rotatably pivoted to the lower ends of said supporting arms, a caterpillar belt running on said rollers, means for tightening said caterpillar belt, spring means holding said supporting arms resiliently in operative position, and means for turning said supporting arms about their pivoting axes of attachment against the direction of movement of said aircraft so as to turn said supporting arms together with said supporting rollers and said caterpillar belt at least substantially inside the body of said aircraft, whenever required.

10. A caterpillar type landing gear for aircraft comprising a series of parallel supporting arms turnably pivoted to the body of said aircraft in a horizontal plane spaced from each other in longitudinal direction of said aircraft, connecting means turnably secured to points of said supporting arms which are spaced from said points of pivotal attachment to said aircraft body and lying also in a horizontal plane, said connecting means guiding said supporting arms parallel to each other during turning of the same about their pivoting axes of attachment, supporting rollers freely rotatably pivoted to the lower ends of said supporting arms, a caterpillar belt running on said rollers, common means for tightening said caterpillar belt and holding said supporting arms resiliently in operative position, and means for turning said supporting arms about their pivoting axes of attachment against the direction of movement of said aircraft so as to turn said supporting rollers and arms together with said supporting rollers and said caterpillar belt at least substantially inside the body of said aircraft, whenever required.

11. A caterpillar type landing gear for aircraft comprising a series of parallel supporting arms turnably pivoted to the body of said aircraft in a horizontal plane spaced from each other in longitudinal direction of said aircraft, connecting means turnably secured to points of said supporting arms which are spaced from said points of pivotal attachment to said aircraft body and lying also in a horizontal plane, said connecting means guiding said supporting arms parallel to each other during turning of the same about their pivoting axes of attachment, supporting rollers freely rotatably pivoted to the lower ends of said supporting arms, a caterpillar belt running on said rollers, means arranged in front of the foremost of said pivoting arms and engaging said caterpillar belt pulling the same in direction of movement of said aircraft, thereby simultaneously tightening said belt and tending to turn said supporting arms about their pivoting axes in direction of movement of said aircraft, stop means limiting such turning movement of said supporting arms when said supporting rollers and said caterpillar belt supported by the same are in operative landing position, and hand operated means for turning said supporting arms about their pivoting axes against direction of movement of said aircraft so as to turn said supporting arms together with said supporting rollers and said caterpillar belt at least substantially inside the body of said aircraft, whenever required.

12. A caterpillar type landing gear for aircraft comprising at least two parallel supporting arms of equal length turnably pivoted to the body of said aircraft in a horizontal plane spaced from each other in longitudinal direction of said craft, connecting means turnably secured to points of said supporting arms which are spaced from said points of pivotal attachment to said aircraft body and lying also in a horizontal plane, said connecting means guiding said supporting arms parallel to each other during turning of the same about their pivoting axes of attachment, supporting rollers freely rotatably pivoted to the lower ends of said supporting arms, a belt tightening roller, a pivoting arm freely rotatably carrying said belt tightening roller and turnably pivoted to the body of said aircraft so that said belt tightening roller is positioned in front of the foremost of said supporting arms, a caterpillar belt running on said supporting rollers and said belt tightening roller, spring means tending to turn said pivoting arm together with said belt tightening roller in direction of movement of said aircraft, thereby simultaneously tightening said belt and tending to turn said supporting arms about their pivoting axes in direction of movement of said aircraft, stop means limiting such turning movement of said supporting arms when said supporting rollers and said caterpillar belt supported by the same are in operative landing position, and hand operated means for turning said supporting arms about their pivoting axes against direction of movement of said aircraft so as to turn said supporting arms together with said supporting rollers and said caterpillar belt at least substantially inside the body of said aircraft, whenever required.

13. A caterpillar type landing gear for aircraft comprising at least two parallel supporting arms of equal length turnably pivoted to the body of said aircraft in a horizontal plane spaced from each other in longitudinal direction of said craft, resilient connecting means turnably pivoted to said supporting arms at points lying in a horizontal plane vertically spaced from those points of said supporting arms at which the same are pivoted to said body of said aircraft, said resilient connecting means guiding said supporting arms parallel to each other during turning of the same about their points of pivotal attachment to said body of said aircraft, supporting rollers freely rotatably pivoted to the lower ends of said supporting arms, a belt tightening roller, a pivoting arm turnably pivoted to said body of said aircraft in front of the foremost of said supporting arms and freely rotatably carrying said belt tightening roller so that the same is positioned in front of the foremost of said supporting rollers slightly above the horizontal plane in which said supporting rollers are lying, a caterpillar belt running on said supporting rollers and said tightening roller so as to form a slightly inclined belt portion between said foremost supporting roller and said belt tightening roller facilitating landing of said aircraft on rough ground, means tending to turn said pivoting arm in direction of movement of said aircraft, said pivoting arm thereby simultaneously tightening said caterpillar belt and tending to turn said supporting arms in direction of movement of said aircraft, stop means limiting such turning movement of said supporting arms when said supporting rollers and said caterpillar belt supported by the same are in operative landing position, and operating means adapted to be operated from inside said body of said aircraft for turning said supporting arms about their pivoting axes against direction of movement of said aircraft so as to turn said arms together with said supporting rollers, said belt tightening roller and said caterpillar belt at least substantially inside the body of said aircraft.

14. A caterpillar type landing gear for aircraft comprising at least two parallel supporting arms of equal length turnably pivoted to the body of said aircraft in a horizontal plane spaced from each other in longitudinal direction of said craft; resilient connecting means turnably pivoted to said supporting arms at points lying in a horizontal plane vertically spaced from those points of said supporting arms at which the same are pivoted to said body of said aircraft, said resilient connecting means guiding said supporting arms parallel to each other during turning of the same about their points of pivotal attachment to said body of said aircraft; supporting rollers freely rotatably pivoted to the lower ends of said supporting arms, a belt tightening roller; a pivoting arm turnably pivoted to said body of said aircraft in front of the foremost of said supporting arms and freely rotatably carrying said belt tightening roller so that the same is positioned in front of the foremost of said supporting rollers slightly above the horizontal plane in which said supporting rollers are lying; a caterpillar belt running on said supporting rollers and said tightening roller so as to form a slightly inclined belt portion between said foremost supporting roller and said belt tightening roller facilitating landing of said aircraft on rough ground; means adapted to turn said pivoting arm together with said belt tightening roller in direction of movement of said aircraft; spring operating means for operating said spring means so as to turn said pivoting arm and said belt tightening roller, thereby simultaneously tightening said caterpillar belt and tending to turn said supporting arms in direction of movement of said aircraft; stop means limiting such turning movement of said supporting arms when said supporting rollers and said caterpillar belt supported by the same are in operative landing position and are held in such position by said belt tightening roller, said spring means and said spring operating means; and hand operated turning means adapted to be operated from inside said body of said aircraft for turning said supporting arms against direction of movement of said aircraft when said spring means are not operated by said spring operating means so as to turn said arms together with said supporting rollers said belt tightening roller and said caterpillar belt at least substantially inside the body of said aircraft.

15. A caterpillar type landing gear for aircraft comprising at least two parallel resilient supporting arms of equal length being resilient in longitudinal direction and turnably pivoted to the body of said aircraft in a horizontal plane spaced from each other in longitudinal direction of said craft, resilient connecting means turnably pivoted to said resilient supporting arms at points lying in a horizontal plane vertically spaced from those points of said resilient supporting arms at which the same are pivoted to said body of said aircraft, said resilient connecting means guiding said resilient supporting arms parallel to each other during turning of the same about their points of pivotal attachment to said body of said aircraft, supporting rollers freely rotatably pivoted to the lower ends of said resilient supporting arms, a belt tightening roller, a pivoting arm turnably pivoted to said body of said aircraft in front of the foremost of said resilient supporting arms and freely rotatably carrying said belt tightening roller so that the same is positioned in front of the foremost of said supporting rollers slightly above the horizontal plane in which said supporting rollers are lying, a caterpillar belt running on said supporting rollers and said tightening roller so as to form a slightly inclined belt portion between said foremost supporting roller and said belt tightening roller facilitating landing of said aircraft on rough ground, means tending to turn said pivoting arm in direction of movement of said aircraft, said pivoting arm thereby simultaneously tightening said caterpillar belt and tending to turn said resilient supporting arms in direction of movement of said aircraft, stop means limiting such turning movement of said resilient supporting arms when said supporting rollers and said caterpillar belt supported by the same are in operative landing position, and operating means adapted to be operated from inside said body of said aircraft for turning said resilient supporting arms about their pivoting axes against direction of movement of said aircraft so as to turn said arms together with said supporting rollers said belt tightening roller and said caterpillar belt at least substantially inside the body of said aircraft.

16. A caterpillar type landing gear for aircraft comprising at least two parallel resilient supporting arms of equal length being resilient in longitudinal direction and turnably pivoted to the body of said aircraft in a horizontal plane spaced from each other in longitudinal direction of said craft; resilient connecting means turnably pivoted to said resilient supporting arms at points lying in a horizontal plane vertically spaced from those points of said resilient supporting arms at which the same are pivoted to said body of said aircraft, said resilient connecting means guiding said resilient supporting arms parallel to each other during turning of the same about their points of pivotal attachment to said body of said aircraft; supporting rollers freely rotatably pivoted to the lower ends of said resilient supporting arms; a belt tightening roller; a pivoting arm turnably pivoted to said body of said aircraft in front of the foremost of said resilient supporting arms and freely rotatably carrying said belt tightening roller so that the same is positioned in front of the foremost of said supporting rollers slightly above the horizontal plane in which said supporting rollers are lying; a caterpillar belt running on said supporting rollers and said tightening roller so as to form a slightly inclined belt portion between said foremost supporting roller and said belt tightening roller facilitating landing of said aircraft on rough ground, means adapted to turn said pivoting arm together with said belt tightening roller in direction of movement of said aircraft, spring operating means for operating said spring means so as to turn said pivoting arm and said belt tightening roller, thereby simultaneously tightening said caterpillar belt and tending to turn said resilient supporting arms in direction of movement of said aircraft, stop means limiting such turning movement of said resilient supporting arms when said supporting rollers and said caterpillar belt supported by the same are in operative landing position and are held in such position by said belt tightening roller, said spring means and said spring operating means, and hand operated turning means adapted to be operated from inside said body of said aircraft for turning said resilient supporting arms against direction of movement of said aircraft when said spring means are not operated by said spring operating means so as to turn said arms together with said supporting rollers said belt tightening roller and said caterpillar belt at least substantially inside the body of said aircraft.

17. A caterpillar type landing gear for aircraft comprising at least two parallel supporting arms of equal length turnably pivoted to the body of said aircraft in a horizontal plane spaced from each other in longitudinal direction of said craft, resilient connecting means turnably pivoted to said supporting arms at points lying in a horizontal plane vertically spaced from those points of said supporting arms at which the same are pivoted to said body of said aircraft, said resilient connecting means guiding said supporting arms parallel to each other during turning of the same about their points of pivotal attachment to said body of said aircraft, supporting rollers freely rotatably pivoted to the lower ends of said supporting arms, a belt tightening roller, a pivoting arm turnably pivoted to said body of said aircraft in front of the foremost of said supporting arms and freely rotatably carrying said belt tightening roller so that the same is positioned in front of the foremost of said supporting rollers slightly above the horizontal plane in which said supporting rollers are lying, a caterpillar belt running on said supporting rollers and said tightening roller so as to form a slightly inclined belt portion between said foremost supporting roller and said belt tightening roller facilitating landing of said aircraft on rough ground, spring means tending to turn said pivoting arm in direction of movement of said aircraft, said pivoting arm thereby simultaneously tightening said caterpillar belt and tending to turn said supporting arms in direction of movement of said aircraft, stop means limiting such turning movement of said supporting arms when said supporting rollers and said caterpillar belt supported by the same are in operative landing position, and resilient connecting means connecting the upper end of said pivoting arm with one of said supporting arms in such a manner as to enable turning of said supporting arms about their pivoting axes against direction of movement of said aircraft when said pivoting arm is turned in the same direction so as to turn said supporting arms together with said supporting rollers and said caterpillar belt at least substantially inside the body of said aircraft.

18. A caterpillar type landing gear for aircraft comprising at least two parallel supporting arms of equal length turnably pivoted to the body of said aircraft in a horizontal plane spaced from each other in longitudinal direction of said craft, resilient connecting means turnably pivoted to said supporting arms at points lying in a horizontal plane vertically spaced from those points of said supporting arms at which the same are pivoted to said body of said aircraft, said resilient connecting means guiding said supporting arms parallel to each other during turning of the same about their points of pivotal attachment to said body of said aircraft, supporting rollers freely rotatably pivoted to the lower ends of said supporting arms, a belt tightening roller, a pivoting arm turnably pivoted to said body of said aircraft in front of the foremost of said supporting arms in the same plane as these arms and freely rotatably carrying said belt tightening roller so that the same is positioned in front of the foremost of said supporting rollers slightly above the horizontal plane in which said supporting rollers are lying, a caterpillar belt running on said supporting rollers and said tightening roller so as to form a slightly inclined belt portion between said foremost supporting roller and said belt tightening roller facilitating landing of said aircraft on rough ground, means tending to turn said pivoting arm in direction of movement of said aircraft, said pivoting arm thereby simultaneously tightening said caterpillar belt and tending to turn said supporting arms in direction of movement of said aircraft, stop means limiting such turning movement of said supporting arms when said supporting rollers and said caterpillar belt supported by the same are in operative landing position, and resilient connecting means connecting the upper end of said pivoting arm with one of said supporting arms in such a manner as to enable turning of said supporting arms about their pivoting axes against direction of movement of said aircraft when said pivoting arm is turned in the same direction so as to turn said supporting arms together with said supporting rollers and said caterpillar belt at least substantially inside the body of said aircraft.

19. A caterpillar type landing gear for aircraft comprising at least two parallel supporting arms turnably pivoted to the body of said aircraft in a horizontal plane spaced from each other in longitudinal direction of said aircraft; supporting rollers freely rotatably pivoted to the lower ends of said supporting arms; a guiding roller; a pivoting arm turnably pivoted to said body of said aircraft in front of the foremost of said supporting arms and freely rotatably carrying said guiding roller so that the same is positioned in front of the foremost of said supporting rollers slightly above the horizontal plane in which said supporting rollers are positioned; a caterpillar belt running on said supporting rollers and said guiding roller so as to form a slightly inclined belt portion between said foremost supporting roller and said guiding roller, facilitating landing of said aircraft on rough ground; and operating means adapted to be operated from inside of said body of said aircraft and constructed so as to enable turning of said supporting arms and said pivoting arm about their pivoting axes against direction of movement of said aircraft so as to turn said arms together with said supporting rollers, said guiding roller and said caterpillar belt at least substantially inside said body of said aircraft.

20. A caterpillar type landing gear for aircraft comprising at least two parallel supporting arms turnably pivoted to the body of said aircraft in a horizontal plane spaced from each other in longitudinal direction from said aircraft; supporting rollers freely rotatably pivoted to the lower ends of said supporting arms; a guiding roller; a pivoting arm turnably pivoted to said body of said aircraft in front of the foremost of said supporting arms and freely rotatably carrying said guiding roller so that the same is positioned in front of the foremost of said supporting rollers slightly above the horizontal plane, in which said supporting rollers are positioned; connecting means connecting said supporting arms with each other and said pivoting arm so as to force simultaneous turning of said arms; a caterpillar belt running on said supporting rollers and said guiding roller so as to form a slightly inclined belt portion between said foremost supporting roller and said guiding roller, facilitating landing of said aircraft on rough ground; and operating means adapted to be operated from inside of said body of said aircraft and constructed so as to enable turning of said supporting arms and said pivoting arm about their pivoting axes against direction of movement of said aircraft so as to turn said arms together with said supporting rollers, said guiding roller and said caterpillar belt at least substantially inside said body of said aircraft.

21. A caterpillar type landing gear for aircraft comprising at least two parallel supporting arms turnably pivoted to the body of said aircraft in a horizontal plane spaced from each other in longitudinal direction of said aircraft; supporting rollers freely rotatably pivoted to the lower ends of said supporting arms; a guiding roller; a caterpillar belt running on said supporting rollers and said guiding roller; a pivoting arm turnably pivoted to said body of said aircraft and freely rotatably carrying said guiding roller so that the same is positioned in front of the foremost of said supporting rollers slightly above the horizontal plane in which said supporting rollers are positioned, said pivoting arm being shaped and arranged so that during simultaneous turning of said supporting arms and said pivoting arm about their respective pivoting axes said caterpillar belt stays equally stretched; and operating means adapted to be operated from inside of said body of said aircraft and constructed so as to enable turning of said supporting arms and said pivoting arm about their pivoting axes against direction of movement of said aircraft so as to turn said arms together with said supporting rollers, said guiding roller and said caterpillar belt at least substantially inside said body of said aircraft.

22. A caterpillar type landing gear for aircraft comprising at least two parallel supporting arms turnably pivoted to the body of said aircraft in a horizontal plane spaced from each other in longitudinal direction of said aircraft; supporting rollers freely rotatably pivoted to the lower ends of said supporting arms; a guiding roller; a caterpillar belt running on said supporting rollers and said guiding roller; a pivoting arm turnably pivoted to said body of said aircraft and freely rotatably carrying said guiding roller so that the same is positioned in front of the foremost of said supporting rollers slightly above the horizontal plane in which said supporting rollers are positioned, said pivoting arm being shaped and arranged so that during simultaneous turning of said supporting arms and said pivoting arm about their respective pivoting axes said caterpillar belt stays equally stretched; connecting means connecting said supporting arms with each other and said pivoting arm so as to force simultaneous turning of said arms; and operating means adapted to be operated from inside of said body of said aircraft and constructed so as to enable turning of said supporting arms and said pivoting arm about their pivoting axes against direction of movement of said aircraft so as to turn said arms together with said supporting rollers, said guiding roller and said caterpillar belt at least substantially inside said body of said aircraft.

OCTAVIO JOSE ALVAREZ.

REFERENCES CITED

The following references are of record in the file of this patent:

UNITED STATES PATENTS

| Number | Name | Date |
|--------|------|------|
| 2,169,443 | Burke | Aug. 15, 1939 |
| 1,340,789 | Ollivier | May 18, 1920 |
| 1,355,853 | Habsburg-Lothringen | Oct. 19, 1920 |
| 1,981,867 | Knox | Nov. 27, 1934 |
| 1,393,157 | Ollivier | Oct. 11, 1921 |

FOREIGN PATENTS

| Number | Country | Date |
|--------|---------|------|
| 148,209 | British | May 26, 1921 |
| 254,789 | German | Dec. 14, 1912 |